June 17, 1924.

W. J. KEENAN ET AL

VALVE

Filed Feb. 25, 1922

1,497,726

WITNESSES:

INVENTOR
William J. Keenan
John C. Duncan
BY
Their ATTORNEYS

Patented June 17, 1924.

1,497,726

UNITED STATES PATENT OFFICE.

WILLIAM J. KEENAN AND JOHN C. DUNCAN, OF PITTSBURGH, PENNSYLVANIA; SAID KEENAN ASSIGNOR TO SAID DUNCAN.

VALVE.

Application filed February 25, 1922. Serial No. 539,071.

*To all whom it may concern:*

Be it known that we, WILLIAM J. KEENAN and JOHN C. DUNCAN, citizens of the United States, and residents of Pittsburgh, Allegheny County, and State of Pennsylvania, have made a new and useful Improvement in Valves, of which the following is a specification.

The invention relates to valves and it has particular relation to safety valves for gas mains adapted to permit gas to escape when the pressure thereof exceeds a predetermined value.

One of the objects of the invention is to provide a valve, of the character described, in which the movable valve member is provided with a flexible or yieldable portion or diaphragm which is adapted to cooperate with the valve seat to effect a uniform contact therewith and which will conform to slight irregularities thereof, thereby eliminating the accurate grinding and fitting heretofore necessary.

Another object of the invention is to provide a valve of the character described, having a chamber or reservoir formed therein which is adapted to contain a lubricant for preserving the diaphragm and maintaining the same soft and pliable, or for containing a liquid such as mercury for causing the diaphragm to conform to any irregularities in the seat.

A further object of the invention is to provide a valve, of the character designated, that is simple of construction and operation and one that may be manufactured and assembled at relatively small expense.

With such objects in view, as well as other advantages which may be incident to the utilization of the improvement, the invention consists in the parts and combinations thereof hereinafter set forth and claimed, with the understanding that the several necessary elements constituting the same may be varied in proportion and arrangement without departing from the nature and scope of the invention.

In order to make the invention more clearly understood, means are shown in the accompanying drawings for carrying the same into practical effect, without limiting the improvements, in their useful applications, to the particular constructions which, for the purpose of explanation, are made the subject of illustration.

In the accompanying drawings:—

Figure 1:
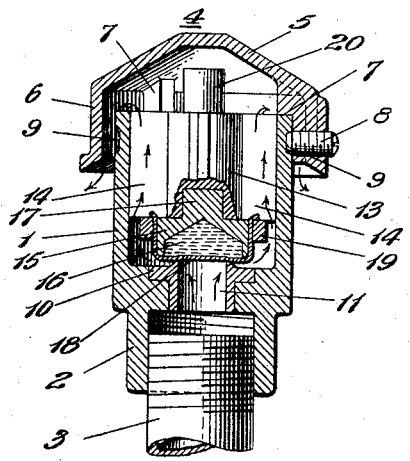
Figure 1 is a vertical sectional view through a valve constructed in accordance with the invention and illustrating the movable valve member partially in elevation and partially in section.

Referring to the drawings, a valve constructed in accordance with the invention is shown as comprising a substantially cylindrical casing 1, the lower portion of which is formed with a tubular extension 2 adapted to be threaded onto the end of a pipe 3 communicating with a gas main, not shown.

The upper portion of the casing 1 is open to the atmosphere and is provided with an overhanging hood or cover 4 which is preferably formed with a substantially conical upper portion 5 and with a depending peripheral flange 6 which extends downwardly beyond the upper edge of the casing 1 and is adapted to prevent rain and foreign matter from entering directly into the casing.

The hood 4 is removably supported upon the casing 1 and in spaced relation therewith by means of a plurality of inwardly extending lugs 7 which are formed integrally with the hood and which engage the upper edge of the casing 1. The flange 6 of the hood 4 is provided with a set screw 8 which engages a recess 9 formed in the side of the casing 1 and which prevents the displacement thereof.

The bottom of the casing 1 is formed with an axial opening into which a member 10, formed with a centrally disposed aperture 11, is securely pressed. The upper face of the member 10 is formed with an upwardly extending and relatively sharp rib or edge 12 which surrounds the aperture 11, and which constitutes the valve seat.

A valve member, indicated as a whole at 13, is mounted for vertical slidable movement within the casing 1 and is formed with a plurality of radially extending ribs 14 which engage the casing 1 and maintain the valve accurately positioned therein.

A member 15 formed with a recess 16, adapted to contain a suitable lubricant, or liquid such as mercury, is secured to the lower portion of the member 13 by means of an extension 17 provided on the member 15 which is pressed into an aperture formed in the lower face of the member 13. A yieldable diaphragm 18, preferably of leather or other fibrous material, is stretched across the recess 16 and is secured in position by means of a ring 19. The diaphragm 18 is adapted to yieldably engage the annular rib 12 and constitutes the closure for the aperture 11.

The diaphragm 18 supports the weight of the member 13 and by reason of its inherent yieldability conforms to the shape of the rib 12 to effect a very accurate closure. The lubricant contained within the reservoir 16 is preferably in the form of a viscous grease and is adapted to be absorbed by the diaphragm 18, thereby maintaining the same soft and pliable and materially increasing its life.

The weight of the member 13 is sufficient to maintain the diaphragm 18 in contact with the valve seat to close the aperture 11 under normal pressure but if the pressure exceeds a predetermined value, the entire valve will be raised vertically permitting the gas to escape between the flanges 14 of the member 13 and over the upper edge of the casing 1, as indicated by the arrows in Fig. 1.

The upper portion of the member 13 is provided with an axial extension or protuberance 20 which is adapted to engage the hood 4 to limit the vertical movement of the member 13.

Figure 5:
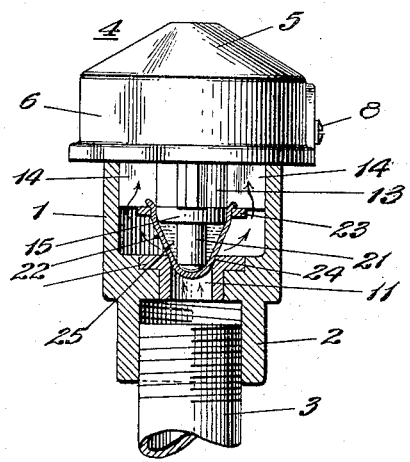
Fig. 5 is a view, partially in side elevation and partially in vertical longitudinal section, of another form of the invention.
Figure 2:
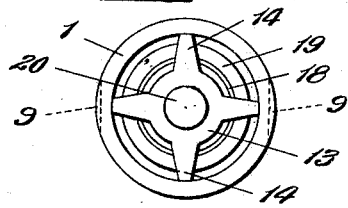
Fig. 2 is a plan view of the structure illustrated in Fig. 1 with the hood portion thereof removed.
Figure 6:
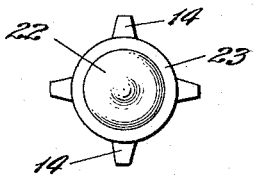
Fig. 6 is a bottom plan view of the valve member illustrated in Fig. 5.
Figure 3:
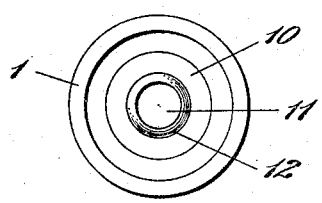
Fig. 3 is a view similar to Fig. 2 but with the valve member removed to illustrate the valve seat.
Figure 7:
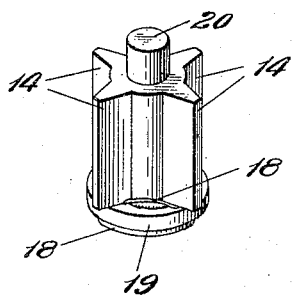
Fig. 7 is a perspective view of the valve member illustrated in Figs. 1 to 4, inclusive.
Figure 4:
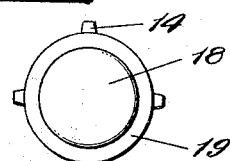
Fig. 4 is a bottom plan view of the movable valve member illustrating the yieldable diaphragm.

In Figs. 5 and 6, there is illustrated a different form of the invention in which the member 15 is provided with a downwardly extending pin 21 over which a diaphragm 22 is stretched and maintained in position by means of a ring 23. The closure thus formed is substantially conical in shape and is adapted to project a slight distance into the aperture 11, the upper edge of which may be countersunk or beveled, as at 24, if so desired. The space between the pin 21 and the diaphragm 22 constitutes a reservoir 25 to supply a preserving lubricant to the diaphragm 22.

From the foregoing, it will be apparent that a very durable valve mechanism is provided that will accommodate itself to slight irregularities in the contour of the valve seat, thereby eliminating the accurate machining and grinding heretofore necessary in structures of this general character.

What we claim as our invention is:—

1. A valve including a valve seat, a movable weight provided with a recess adjacent said valve seat and a flexible diaphragm secured to said weight across the recess so as to present an unsupported surface for yielding contact with said valve seat.

2. A valve comprising a plurality of relatively movable members, one of said members having an exit aperture therein, a yieldable member carried by one of said members for co-operation with the other to close said aperture, one of said members being formed with a recess adjacent to said yieldable member adapted to contain a lubricant for absorption by said yieldable member.

3. A valve comprising a casing a valve seat contained therein provided with an exit aperture, a movable weight disposed within said casing and provided with a recess adapted to contain a lubricant, a fibrous diaphragm carried by said weight and adjacent to said recess for engagement with said valve seat to close said aperture.

4. A valve comprising a casing, a hood carried thereby, and in spaced relation therewith, a valve seat formed in the lower portion of said casing and having an opening therein, a member movably mounted in said casing and provided with a plurality of radially extending rib portions adapted to maintain said member in spaced relation with respect to said casing, means carried by said movable member for engagement with said hood to limit the vertical movement thereof and a compressible member carried by said movable member for engagement with said valve seat to close the opening therein.

5. A valve comprising a substantially cup-shaped casing, a hood carried by the upper portion of said casing and in spaced relation therewith, a valve seat formed in the lower portion of said casing and having an opening therein, a vertically movable valve member disposed within said casing and having a plurality of channels formed in the outer surface and a recess in the lower portion thereof, said recess adapted to contain a lubricant, a fibrous diaphragm stretched across said recess and in contact with the lubricant contained therein and adapted to engage said valve seat to close the opening therein, and an extension carried by said movable valve member for engagement with said hood to limit the vertical movement thereof.

6. A valve including a valve seat and a cup-shaped member, movable with relation to said valve seat, and having a flexible diaphragm secured across the mouth thereof for yielding contact with said valve seat.

7. A valve including a valve seat and a movable cup-shaped member having a flexible diaphragm secured across the mouth thereof and adapted to engage said valve seat, said valve seat having a smaller area than the mouth of said movable member.

8. A valve including a valve seat and an inverted cup-shaped member, movable with relation to said valve seat, and having a flexible diaphragm secured across the mouth thereof so as to present an unsupported surface for yielding contact with said valve seat.

In testimony whereof, we have hereunto subscribed our names this 18th day of February, 1922.

WILLIAM J. KEENAN.
JOHN C. DUNCAN.